No. 874,094. PATENTED DEC. 17, 1907.
J. M. LOW.
BUTTER CUTTER.
APPLICATION FILED MAY 24, 1907.
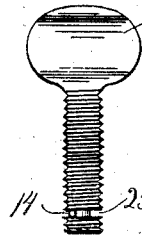
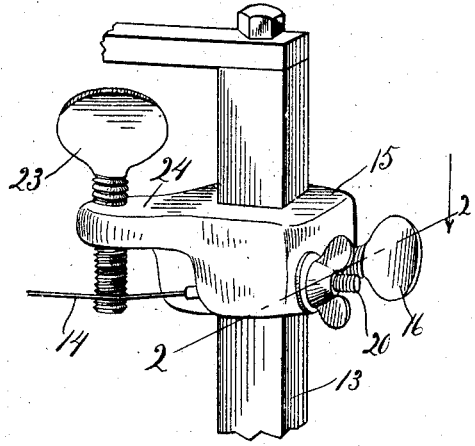
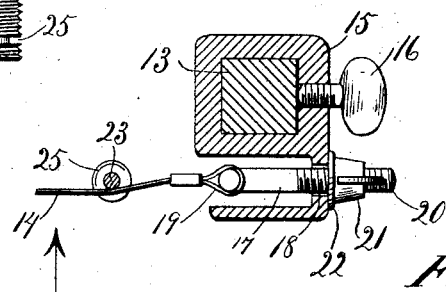
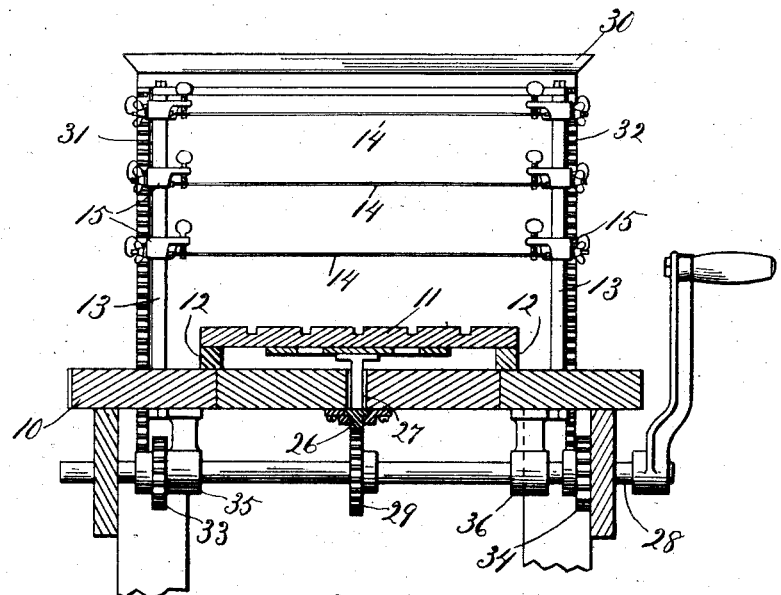
Witnesses:
W. H. Cotton
Charles B. Gillson
Inventor:
John M. Low.
By Louis K. Gillson Atty.

UNITED STATES PATENT OFFICE.

JOHN M. LOW, OF CHICAGO, ILLINOIS.

BUTTER-CUTTER.

No. 874,094.  Specification of Letters Patent.  Patented Dec. 17, 1907.

Application filed May 24, 1907. Serial No. 375,482.

*To all whom it may concern:*

Be it known that I, JOHN M. LOW, a citizen of the United States, and resident of Chicago, county of Cook, and State of Illinois, have invented certain new and useful Improvements in Butter-Cutters, of which the following is a specification, and which are illustrated in the accompanying drawings, forming a part thereof.

The invention relates to butter cutters of that type in which a cutting strand drawn taut between two supports is provided for dividing a mass of butter.

More particularly, the invention relates to butter cutters having a cutting strand which is so disposed with relation to a platen for supporting the material to be cut, or with relation to other cutting members, that blocks of material of a definite size or weight may be cut from the mass to be divided.

The object of the invention is to provide improved means for accurately adjusting the cutting position of the cutting strand of a butter cutter, or similar device; and the invention contemplates a butter cutter comprising supports for a cutting strand, and means for adjustably deflecting the strand intermediate of its ends.

In the accompanying drawings Figure 1 is a perspective view illustrating one of the end supports for the cutting strand of a butter cutter involving the improvements provided by the invention; Fig. 2 is a sectional view taken on the line 2—2 of Fig. 1; Fig. 3 shows, in side elevation, a set screw used upon the device; and Fig. 4 is a vertical transverse section of a butter cutter to which the details of construction illustrated in Figs. 1, 2 and 3 have been applied.

The table of a butter cutting apparatus is generally designated in the drawings by the numeral 10, and is shown as being provided with a platen 11 for receiving the material to be cut, this platen being movable longitudinally over the table and being supported by guide-ways 12. A standard 13 rises from the table 10 at each side of the path of movement of the platen 11, and a cutting strand 14, three of which are shown, is stretched between the standards.

For securing the ends of the cutting strand, supporting heads, as 15, are provided upon each of the standards, and as shown each of these supporting heads is adapted to be verticallly adjusted upon the standard by which it is carried, and is secured in any adjusted position by means of a clamping screw 16. A hook 17, slidably mounted at 18 in each of the supporting heads 15, is provided for receiving the looped end 19 of the cutting strand 14, and has a threaded stem 20 for receiving a winged nut 21 and washer 22, by means of which the cutting strand is drawn taut.

In use the cutting strand 14 may be adjusted to approximately the required position, with reference to the platen 11, for dividing a mass of material carried by the platen into slabs of the desired thickness as the platen is moved between the standards 13, 13, by moving the supporting heads 15 vertically on the standards 13.

For accurately adjusting the vertical position of the cutting strand 14, a set-screw, as 23, is provided for bearing on the cutting strand to deflect it. As shown, such a set-screw is provided adjacent each end of the strand, and each of these set-screws has a threaded engagement with an arm 24, formed integral with one of the supporting heads 15 and projecting inwardly from the standard 13 over the cutting strand. Preferably a circumferential groove 25 is formed in the set-screw 23 for receiving the cutting strand, and the set-screw is so positioned that that part of the wall of the groove 25 which is engaged by the cutting strand is out of line with the end supports for the strand, as is most clearly shown in Fig. 2. By means of this arrangement the cutting strand is horizontally deflected by the set-screw 23 in the direction from which material will be forced upon the strand for cutting, as shown by the arrow in Figs. 1 and 2 of the drawings, and displacement of the strand from the groove 25 by the cutting operation is thus prevented.

In the form of apparatus shown in Fig. 4 of the drawings, the platen 11 is provided with a longitudinal gear rack 26, which moves in a slot 27 formed in the table 10, and the platen may be caused to travel upon the guide-ways 12, 12, by means of a crank shaft 28, carrying a pinion 29, for engaging the gear-rack 26.

A vertically-movable cutting head 30 may be provided for cutting the material carried by the platen 11 into cubes, after it has been divided into slabs by a movement of the platen beneath the cutting strand 14. As shown the cutting head 30 is provided with vertical gear-racks 31, 32, which extend downwardly through the table 10, and these gear-racks are adapted to be engaged by pinions 33, 34, mounted on the crank shaft 28, by longitudinally shifting the crank shaft in its bearings, shown at 35, 36. This longitudinal movement of the crank shaft 28 effects the disengagement of the gear pinion 29 and gear rack 26, and the cutting head 30 may then be raised or lowered by rotating the crank shaft without producing longitudinal movement of the platen 11.

It has been found in practice that in cutting a mass of material into cubes or prints of a definite size, in the manner just described, the weight of the cubes may be most conveniently controlled by accurately positioning the cutting members employed for dividing the mass into slabs. In the form of construction illustrated, this may be readily effected by turning the set-screws 23 to vertically deflect the cutting strands 14. A sufficient deflection of the strand for securing the required adjustment may generally be obtained without loosening the hook 17 by means of which the strand is drawn taut. If, however, a greater deflection is desired the strain on the wire may be reduced by turning the wing nut 21 backwardly upon the stem of the hook.

I claim as my invention—

1. In a butter cutter, in combination, a cutting strand, supports for the strand, and means for adjustably deflecting the strand intermediate of its ends.

2. In a butter cutter, in combination, a cutting strand, a platen movable beneath the strand, and a set-screw bearing upon the strand adjacent one of its ends.

3. In a butter cutter, in combination, a pair of standards, a supporting head adjustably mounted on each of the standards, a cutting strand drawn between the standards, the ends of the strand being secured in the supporting heads, and a set-screw mounted in each of the supporting heads and bearing on the strand adjacent its end to deflect it.

4. In a butter cutter, in combination, a cutting strand, supports for the strand, means for drawing the strand taut, and means for adjustably deflecting the strand intermediate of its ends.

5. In a butter cutter, in combination, a cutting strand, supports for the ends of the strand, a set-screw out of line with the end supports and having a circumferential groove for receiving the strand, and a threaded support for the screw.

JOHN M. LOW.

Witnesses:
CHARLES B. GILLSON,
LOUIS K. GILLSON.